US009158998B2

(12) United States Patent
Kawai

(10) Patent No.: US 9,158,998 B2
(45) Date of Patent: Oct. 13, 2015

(54) TEMPLATE PROCESSING PROGRAM AND TEMPLATE PROCESSING METHOD

(71) Applicant: BROTHER KOGYO KABUSHIKI KAISHA, Nagoya-shi, Aichi-ken (JP)

(72) Inventor: Mina Kawai, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 13/847,611

(22) Filed: Mar. 20, 2013

(65) Prior Publication Data

US 2013/0258403 A1 Oct. 3, 2013

(30) Foreign Application Priority Data

Mar. 30, 2012 (JP) .................................. 2012-079823

(51) Int. Cl.
*G06F 3/12* (2006.01)
*G06K 15/00* (2006.01)
(52) U.S. Cl.
CPC ............ *G06K 15/005* (2013.01); *G06F 3/1204* (2013.01); *G06F 3/1257* (2013.01); *G06F 3/1288* (2013.01)
(58) Field of Classification Search
None
See application file for complete search history.

(56) References Cited

U.S. PATENT DOCUMENTS

| 5,794,052 | A  | * | 8/1998 | Harding | 717/178 |
| 2002/0184189 | A1 | * | 12/2002 | Hay et al. | 707/1 |
| 2006/0119885 | A1 | * | 6/2006 | Jeon et al. | 358/1.15 |
| 2006/0271868 | A1 | * | 11/2006 | Sullivan et al. | 715/764 |
| 2007/0111791 | A1 | * | 5/2007 | Arbogast et al. | 463/40 |
| 2009/0313209 | A1 | * | 12/2009 | Lu et al. | 707/2 |
| 2009/0327934 | A1 | * | 12/2009 | Serpico et al. | 715/764 |
| 2011/0231528 | A1 | * | 9/2011 | Ishii | 709/220 |
| 2011/0314407 | A1 | * | 12/2011 | Cruz Moreno et al. | 715/777 |

FOREIGN PATENT DOCUMENTS

JP 2006099261 4/2006

OTHER PUBLICATIONS

European Search Report issued in Application No. 13160475.3 on Feb. 17, 2014.

* cited by examiner

*Primary Examiner* — Vincent Rudolph
*Assistant Examiner* — Richa Mishra
(74) *Attorney, Agent, or Firm* — McCarter & English, LLP

(57) ABSTRACT

The disclosure discloses a non-transitory computer-readable recording medium, storing the template processing program for executing steps on a control device of an operation terminal. The terminal is connected with a print label producing apparatus using a template t, and with a server configured to store a plurality of language versions of mutually different language types for the template. The terminal comprises a display device, the control device, and a memory. The steps comprises a language selection receiving step for receiving a selection of at least one language type, a downloading step for downloading from the server at least one template that contains the language version of the language type, a combined file generating step for generating a combined file that combines a plurality of language versions using mutually different language types into a single file, and a storing step for storing the combined file in the memory.

10 Claims, 11 Drawing Sheets

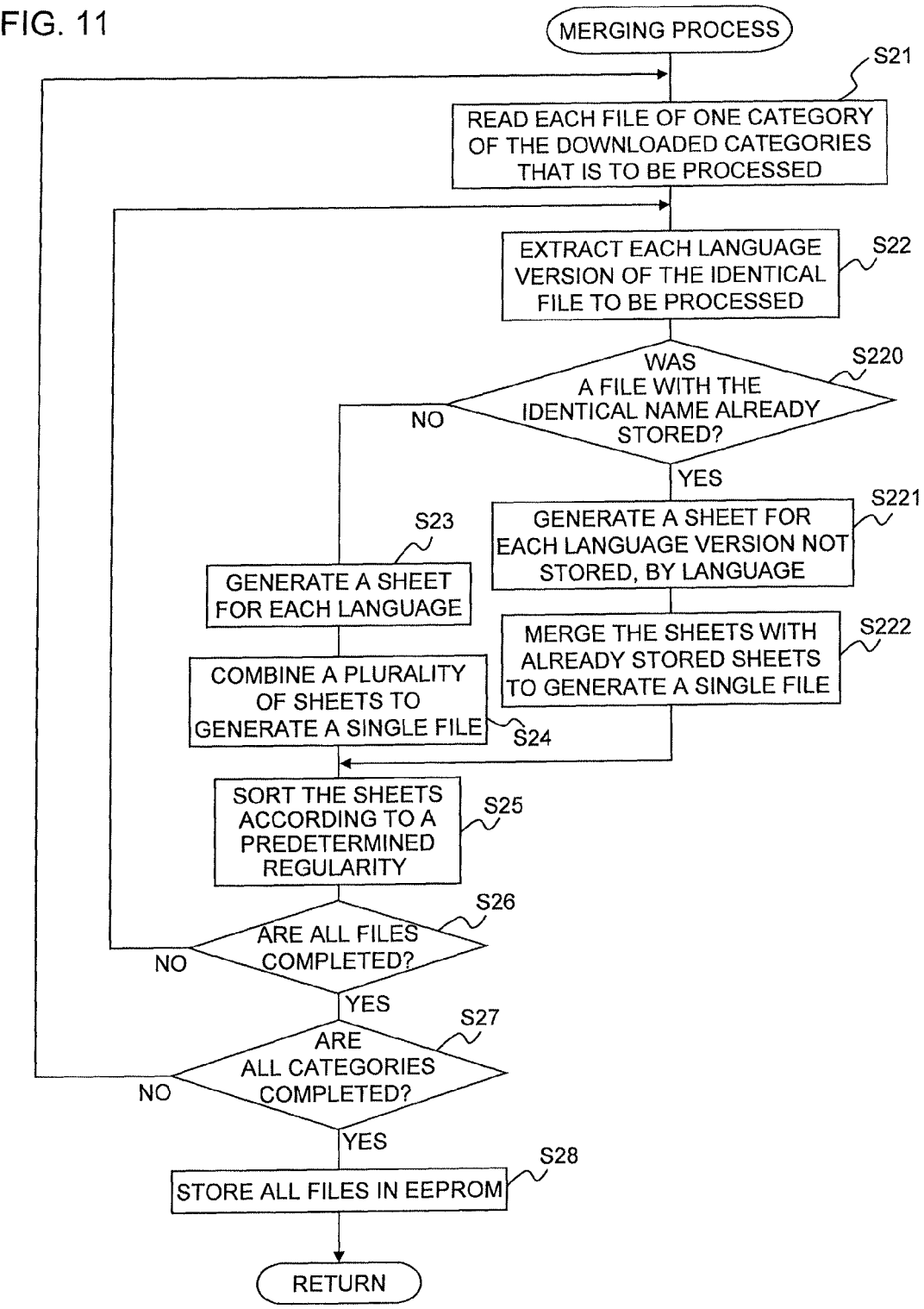

TEMPLATE PROCESSING PROGRAM AND TEMPLATE PROCESSING METHOD

CROSS-REFERENCE TO RELATED APPLICATION

The present application claims priority from Japanese Patent Application No. 2012-079823, which was filed on Mar. 30, 2012, the disclosure of which is incorporated herein by reference in its entirety.

BACKGROUND

1. Field

The present disclosure relates to a template processing program and a template processing method executed on an operation terminal capable of operating a print label producing apparatus.

2. Description of the Related Art

There is already known, for example, a print label producing system configured to produce a preferred print label via an operation from an operation terminal such as a PC, etc. According to this system, when an operator operates the operation terminal (computer device) to specify the printed contents of a print label (label with adhesive material) that he or she wants to produce, the corresponding print data is transmitted from the operation terminal to the print label producing apparatus (tape printing head). Then, printing means (a thermal head) provided to the print label producing apparatus executes printing corresponding to the print data on a print-receiving medium (laminated film), thereby producing the print label.

When the operator connects the operation terminal to the print label producing apparatus to produce a print label as described above, it is extremely cumbersome for the operator to manually set all print objects, such as text, visual objects, and the like, to be printed on the print label. Here, according to this prior art, a plurality of types of so-called templates in which a plurality of print object layout frames is assigned in a predetermined format is normally prepared. The operator then selects a template suitable for his or her intended print format and assigns preferred text, etc., to the print object layout frames of the template, thereby easily producing a preferred print label.

In recent years, in response to market internationalization, there have been cases where a manufacturer of a print label producing apparatus, for example, prepares a plurality of language versions (Japanese version, English version, French version, etc.) of mutually different language types for a single template. The plurality of language versions of each template is prepared and stored in advance on a server, for example. Nevertheless, normally the plurality of language versions is often provided in individual files even though the templates are of identical contents. As a result, it is extremely troublesome in a case where the operator wants to acquire two or more language versions of a single template since the operator must perform downloading from the server for each language and, even after downloading, the language versions are provided in separate files.

SUMMARY

It is therefore an object of the present disclosure to provide a template processing program and a template processing method capable of improving user-friendliness in a case where the operator is to acquire two or more language versions of a single template.

In order to above-mentioned object, according to the aspect, there is provided a non-transitory computer-readable recording medium, storing the template processing program for executing steps on a control device of an operation terminal. The terminal is connected with a print label producing apparatus configured to produce a print label using a template to which a print object is assigned and configured in a predetermined arrangement, and with a server configured to store a plurality of language versions of mutually different language types for the template prepared in advance, so that information is transmitted and received. The terminal comprises an operation device, a display device configured to execute a preferred display, the control device, and a memory. The steps comprises a language selection receiving step for receiving a selection of at least one language type via the operation device, a downloading step for downloading from the server at least one template that contains the language version of the language type received in the language selection receiving step from among the templates of a plurality of language versions stored in the server, a combined file generating step for generating a combined file that combines a plurality of language versions using mutually different language types related to the template downloaded in the downloading step into a single file, and a storing step for storing the combined file generated in the combined file generating step in the memory.

When a print label is produced by the print label producing apparatus, it is extremely cumbersome for the operator to manually set all contents, such as the text, etc., to be printed on the print label. Normally a so-called template in which a plurality of print objects, such as the text, etc., is assigned in a predetermined format is used. The operator can then easily produce a preferred print label by selecting and using a template suitable for his or her intended print format.

According to the present disclosure, it is possible to combine a plurality of language versions into a single file if the templates to be downloaded from the server are templates of identical contents. That is, when the template processing program of the present disclosure is executed by control means of an operation terminal, first a selection of the language type by the operator is received in a language selection receiving procedure.

Subsequently, in a downloading procedure, at least one of the templates of the plurality of language versions stored in advance in the server as described above that contains a language version of the language type received in the language selection receiving procedure is downloaded. Then, in a combined file generating procedure, a single combined file that contains the plurality of language versions of mutually different language types of the downloaded template is generated. The generated combined file is stored in storage means of the operation terminal in a storage procedure.

As described above, according to the present disclosure, a single combined file that combines the plurality of language version types contained in the templates downloaded from the server is generated, and each template is stored in the form of that combined file (in other words, the plurality of language versions is provided in a single file). As a result, even in a case where the operator wants to acquire two or more language versions of a single template, it is possible to download the versions together from the server. Further, even after the downloading, the plurality of language version types is contained together in a single file, thereby increasing user-friendliness when reading or otherwise handling the templates, compared to prior art in which the versions are provided in separate files.

BRIEF DESCRIPTION OF THE DRAWINGS

FIG. 11 is a flowchart showing the detailed procedure of the merging process within the control procedure executed by the CPU of the operation terminal.

DETAILED DESCRIPTION OF THE PREFERRED EMBODIMENTS

The following describes one embodiment of the present disclosure with reference to accompanying drawings.

General System Configuration

Figure 1:
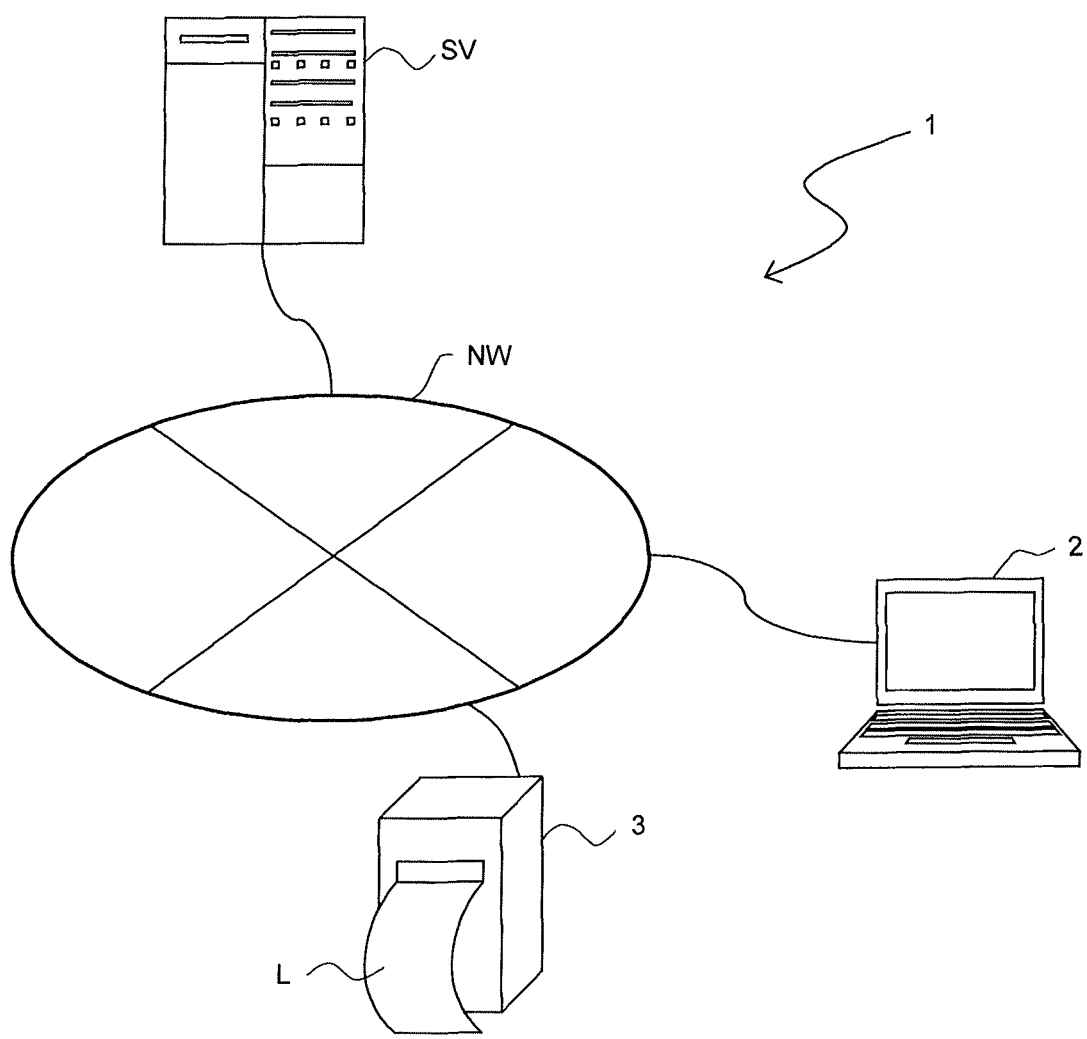
FIG. 1 is a system configuration diagram showing an overview of a contents information processing system according to one embodiment of the present disclosure.
Figure 2:
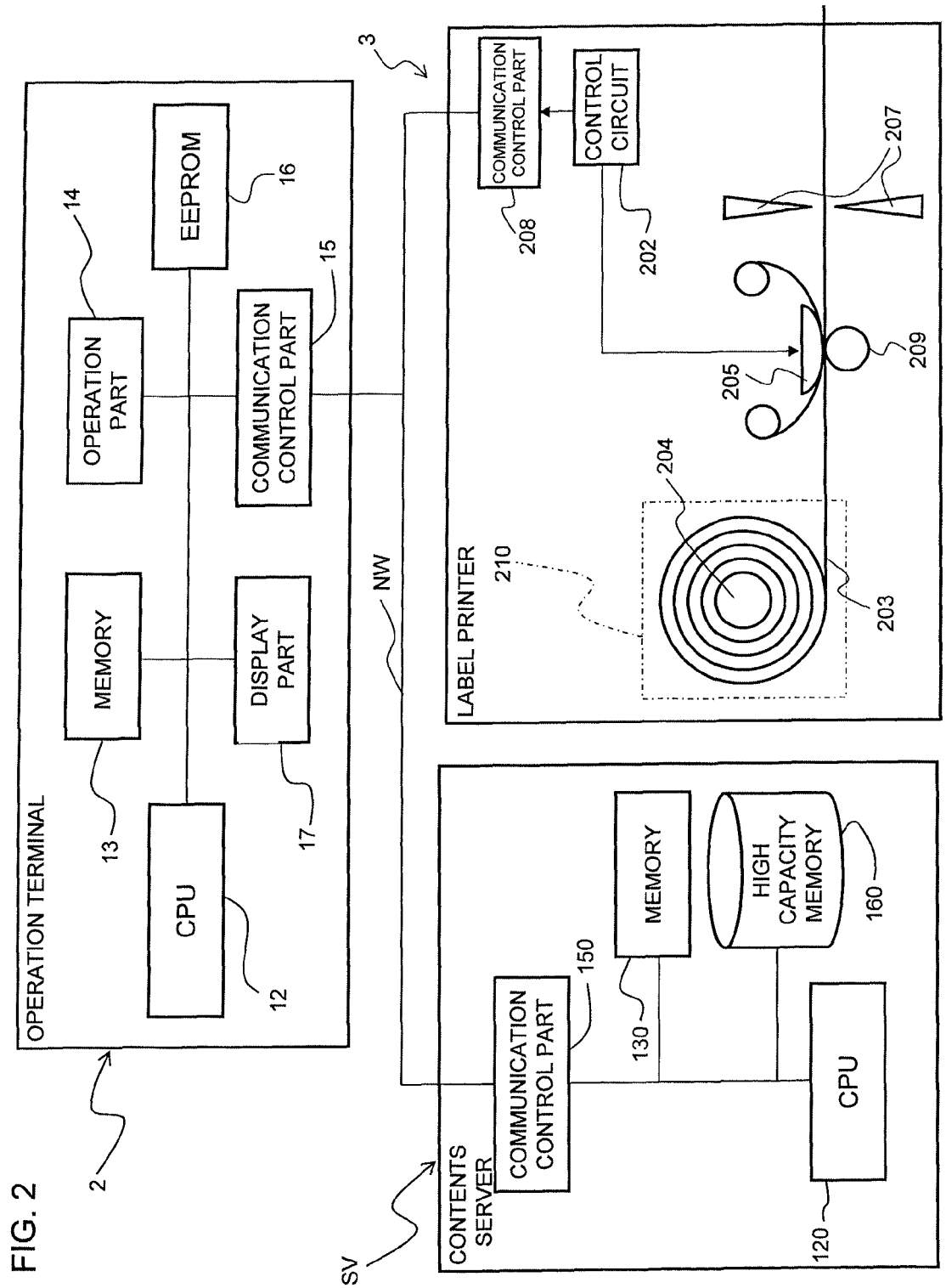
FIG. 2 is a functional block diagram showing the detailed functions of the contents information processing system.

The following describes the configuration of the overall contents information processing system which executes the template processing method of this embodiment, with reference to FIG. 1 and FIG. 2.

In FIG. 1, a contents information processing system 1 comprises a contents server SV, an operation terminal 2 made of a general-purpose personal computer, for example, and a label printer 3 connected to the operation terminal 2 via an interface such as a USB, etc., for example. Then, the contents server SV, the operation terminal 2, and the label printer 3 are connected to each other via a network NW. Note that this embodiment describes an illustrative scenario in which a template T (details described later) used to produce a print label L via the label printer 3 is provided as contents from the contents server SV to the label printer 3 via the operation terminal 2. The label printer 3 transmits and receives various information and instruction signals with the operation terminal 2, and produces the print label L comprising print such as preferred characters, graphics, etc., based on an operation of the operation terminal 2.

The operation terminal 2, as shown in FIG. 2, comprises a CPU 12, a memory 13 made of RAM, ROM, or the like, for example, an EEPROM 16, an operation part 14 into which an operator inputs instructions or information, a display part 17 configured to display various information and messages, and a communication control part 15 configured to control the transfer of information signals with the label printer 3 via the network NW.

The contents server SV, as shown in FIG. 2, comprises a CPU 120, a memory 130 made of RAM, ROM, or the like, for example, a communication control part 150 configured to control the transfer of information signals with the operation terminal 2 and the label printer 3 via the network NW, and a high capacity memory 160 made of a hard disk device and configured to store various information.

The CPU 120 and the CPU 12 utilize a RAM temporary storage function and perform signal processing in accordance with a program stored in advance in ROM. The CPU 12 performs the transmission and reception of various instruction and information signals via the network NW with the label printer 3 by the above described signal processing. The CPU 120 performs the transmission and reception of various instruction and information signals via the network NW with the operation terminal 2 by the above described signal processing.

The label printer 3, as shown in FIG. 2, comprises a tape roll holder part 210 configured to detachably hold a tape roll 204 (or a cartridge comprising the tape roll 204) around which is wound a tape (actually in a spiral shape, but simplified and shown as a concentric circle) 203 as the print-receiving medium, a print head 205 configured to perform preferred printing on the tape 203 fed out from this tape roll 204, a cutter 207 configured to cut the tape 203 on which printing is completed at a predetermined length to form the print label L (refer to FIG. 1), and a feeder 209 that is provided opposite the print head 205, controlled by a control circuit 202, and configured to feed the tape 203 from the tape roll 204. Further, the control circuit 202 is connected with the communication control part 15 of the operation terminal 2 and the communication control part 150 of the contents server SV by the network NW via a communication control part 208, and is capable of transmitting and receiving information with the operation terminal 2 and the contents server SV.

Templates

When the operator operates the label printer 3 from the operation terminal 2 to produce the print label L, it is extremely cumbersome for the operator to manually set all contents, such as the text, etc., to be printed on the print label L. Here, according to this embodiment, the so-called template T (refer to FIG. 4, etc., described later) where a plurality of layout frames of print objects such as the above described text, etc., is assigned in a predetermined format (arrangement) is prepared. The operator can then easily produce a preferred print label by selecting and using a template suitable for his or her intended print format.

According to this embodiment, a plurality of types of the template T produced and uploaded in advance is stored in the high capacity memory 160 of the contents server SV. Each of the templates T is read from a high capacity memory label image memory 220, and downloaded and installed to the operation terminal 2 via the network NW (or directly installed to a suitable memory within the control circuit 202 of the label printer 3) by a suitable operation (described later) of the operator on the operation part 14 of the operation terminal 2.

Template Language Version Details and Problems

Here, in response to market internationalization in recent years, there have been cases where a manufacturer of the label printer 3, for example, prepares a plurality of language versions (Japanese version, English version, French version, etc.) of mutually different language types for one of the above described templates T. The plurality of language versions of each template T is prepared in advance on the contents server SV, for example. That is, a plurality of language versions for all templates T is prepared and stored in advance on the high capacity memory 160, for example, of the contents server SV. Nevertheless, normally, the above described plurality of language versions is often provided in individual files (such a file that contains a template is hereinafter suitable referred to as a "template file"), even if the templates T are of identical contents. As a result, it is extremely troublesome in a case where the operator wants to acquire two or more language versions of a single template T since the operator must perform downloading from the contents server SV for each language and, even after downloading, the versions are provided in separate template files.

Special Characteristics of this Embodiment

The special characteristics of this embodiment lie in the fact that, in response to the above, the operator can download together two or more language versions of the template T of identical contents and combine this plurality of language versions into a single template file. In the following, details on the functions will be described in order.

Figure 3:
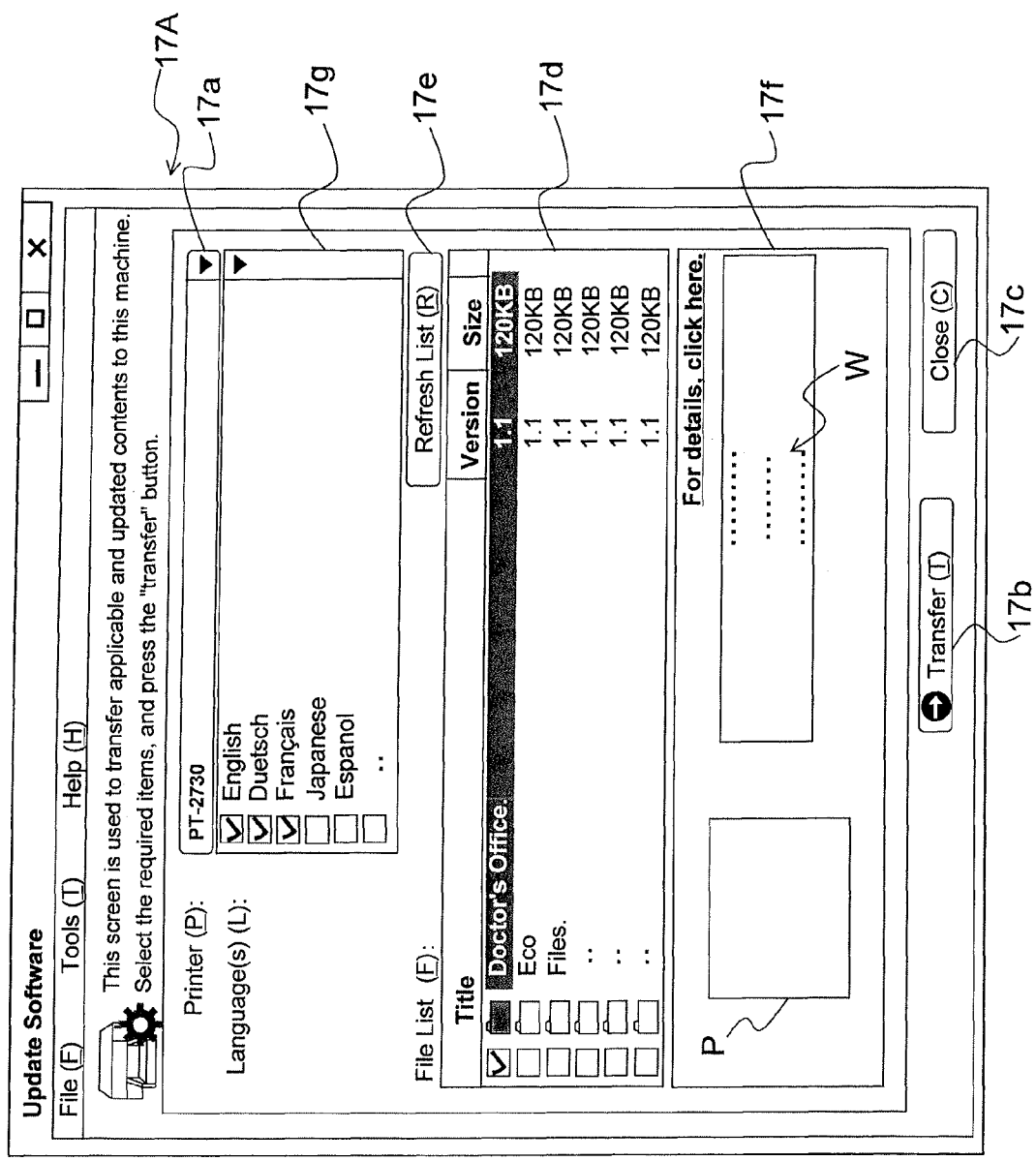
FIG. 3 is a diagram showing a display example of the display part of the operation terminal when a template is installed.

FIG. 3 shows an input operation screen 17A displayed on the display part 17 of the operation terminal 2 when installing the above described template T in this embodiment. An equipment display box 17a configured to display equipment identification information (model names in this example) of the label printer 3 in a selectable manner, a Transfer button 17b, a Close button 17c, a list box 17d configured to display a list of category groups (described later) of the template T, a Refresh List button 17e, and a display area 17f configured to display a preview image P and explanatory text W corresponding to each of the templates T are provided to this input operation screen 17A.

Further, the most significant characteristic of this embodiment is the provision of a language display box 17g configured to display a plurality of types of languages in a selectable manner so that the operator can select two or more language versions of the template T of identical contents. A plurality of types of languages (English, German, French, Japanese, Spanish, etc., in this example) is displayed in the language display box 17g in a manner that permits simultaneous selection of a plurality of languages.

The operator suitably operates the operation part 14, selects a suitable model of the label producing apparatus 3 ("PT-2730" in this example) in the above described equipment display box 17a, and then selects a plurality of the languages displayed in the above described language display box 17g. In this example, the operator has selected the three languages English, German, and French by checkbox input in the language display box 17g as the preferred languages of the plurality of language versions of the above described template T.

With the above described selection, a search is contented for the templates T corresponding to the selected model and languages in the contents server SV, and the search results are displayed in the above described list box 17d. According to this embodiment, the templates T are grouped into a plurality of category groups by application, for example, and the plurality of templates T is associated with each category group. In this example, a plurality of category group names, such as "Doctor's Office", "Eco", "Files", etc., is displayed in list format in the above described list box 17d along with the version name and size (in alphabetical order, for example).

The operator suitably operates the operation part 14 and selects one of the category groups (template categories) displayed in the list box 17d as described above. In this example, the category group name "Doctor's Office" is selected in the list box 17d by checkbox input. After this selection, the above described Transfer button 17b is operated, thereby downloading the above described plurality of selected language versions (German, English, and French in this example) of all templates T of the selected category group from the contents server SV together. As previously described, at this time, the above described German version, English version, and French version of the template T of identical contents are combined into a single template file (hereinafter suitably referred to as "combined file") after being respectively downloaded as separate files.

Figure 4A:
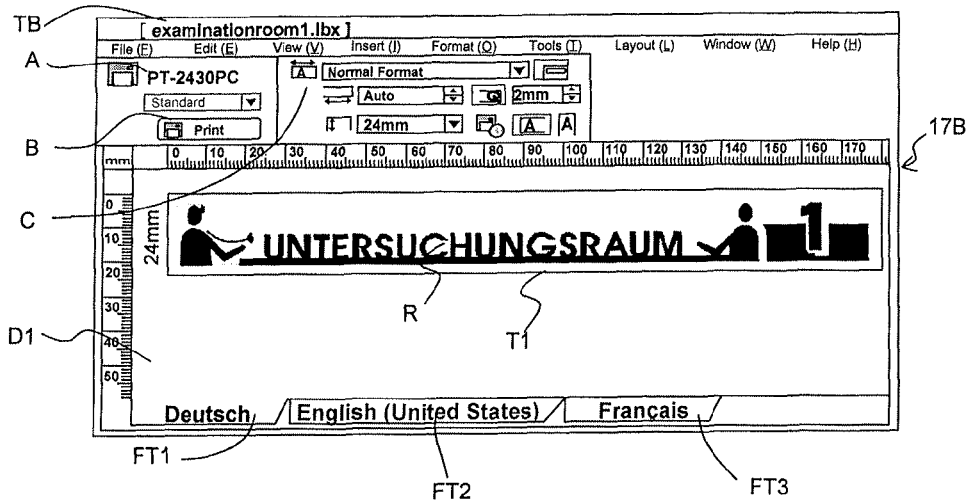
FIG. 4A is a diagram showing a display example of the display part of the operation terminal based on a combined file of identical contents that contains a German version, English version, and French version.

FIG. 4A shows an example of the template display screen displayed on the above described display part 17 of the operation terminal 2 when the three languages "German", "English", and "French" and the category group "Doctor's Office" are selected as described above.

According to the template display screen 17B shown in FIG. 4A, a first sheet D1 that contains a German version template T1 on which a print R of predetermined contents (in this example, "Examination Room" contents) is expressed in German, a second sheet D2 that contains an English version template T2 on which the print R of the same "Examination Room" contents is expressed in English, and a third sheet D3 that contains a French version template T3 on which the print R of the same "Examination Room" contents is expressed in French are incorporated into a combined form in a single template file.

Figure 4B:
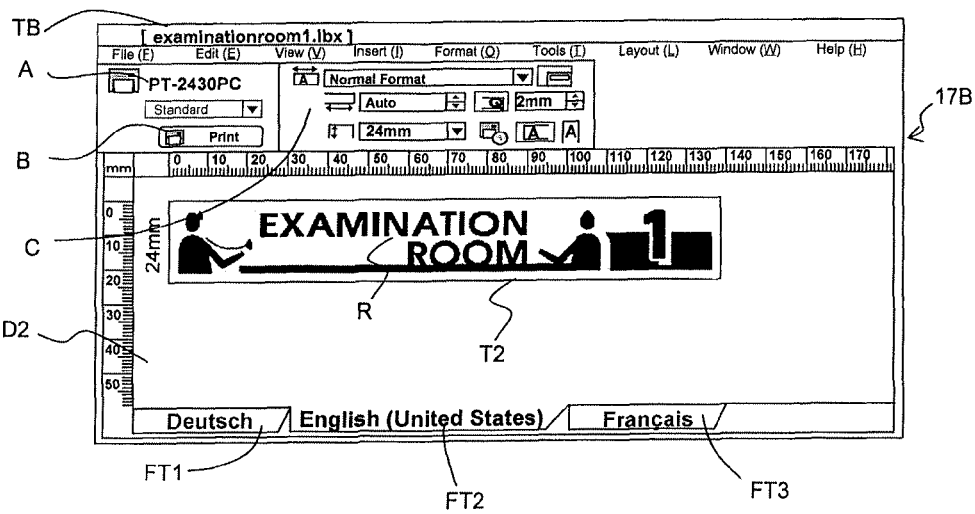
FIG. 4B is a diagram showing a display example of the display part of the operation terminal based on a combined file of identical contents that contains a German version, English version, and French version.
Figure 4C:
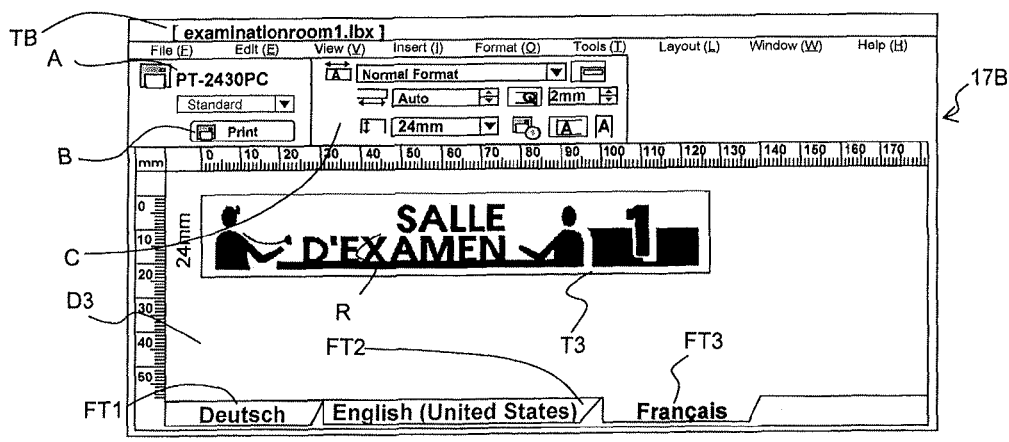
FIG. 4C is a diagram showing a display example of the display part of the operation terminal based on a combined file of identical contents that contains a German version, English version, and French version.

Each of sheets D1, D2, and D3 respectively comprises tabs FT1, FT2, and FT3 at the lower end and, when the operator selects one of the tabs FT1-FT3 via the operation part 14, the corresponding sheet D1, D2, or D3 is displayed at the front (the displays are interswitchable). FIG. 4A shows the state in which the first sheet D1, which contains the above described print R expressed in German, is displayed when the tab FT1 is selected. FIG. 4B shows the state in which the second sheet D2, which contains the above described print R expressed in English, is displayed when the above described tab FT2 is selected. FIG. 4C shows the state in which the third sheet D3, which contains the above described print R expressed in French, is displayed when the tab FT3 is selected.

At this time, the layered order of each of the above described sheets D1-D3 (in other words, the left to right order of the tabs FT1-FT3) is sorted alphabetically by language as a predetermined regularity in this example. That is, the tab FT1 of the sheet D1 expressed in German, which has the first character "D", is positioned farthest to the left, the tab FT2 of the sheet D2 expressed in English, which has the first character "E", is positioned next, and the tab FT3 of the sheet D3 expressed in French, which has the first character "F", is positioned farthest to the right.

Note that the order applied to the layered order of each of the above described sheets D1-D3 (in other words, the left to right order of the tabs FT1-FT3) may be sorted using another predetermined regularity, such as the order of length of the templates T or the chronological order in which the templates T were produced, for example.

A file title bar TB that shows the file name of the template file that contains the template T selected by a suitable operation from the plurality of templates T included in the above described category group, a model name display area A that displays the aforementioned model name, a print button B for instructing the label printer 3 to produce a label using the template T, a setting area C for setting various settings at the time of text input using the template T, and the like are provided to the upper side of the template display screen 17B. As shown on the title bar TB of FIGS. 4A-4C, in this example, the template file (file name "examinationroom1") of one set of contents included in the category group "Doctor's Office" is selected and displayed by a suitable operation of the above described operation part 14.

Control Procedure

Figure 5:
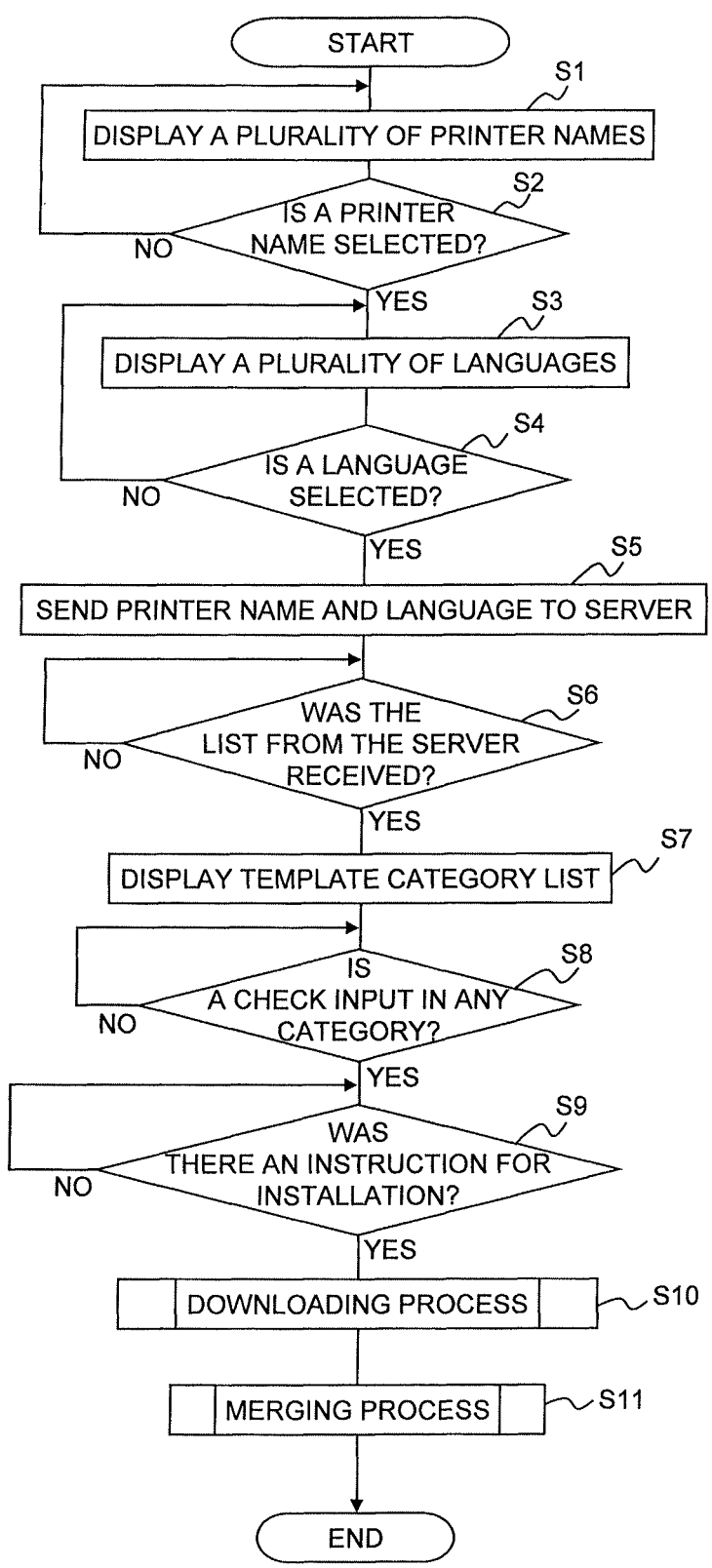
FIG. 5 is a flowchart showing the control procedure executed by the CPU of the operation terminal.

FIG. 5 shows the control procedure executed by the CPU 12 of the operation terminal 2 using the template processing program stored in the above described ROM of the memory 13, for executing the template processing method of this embodiment based on the aforementioned technique.

First, in step S1, the CPU 12 displays (in a pull-down display in this example) a plurality of model names (model names corresponding to installed printer drivers, for example) of the label printer 3 already stored in the memory 13 in the equipment display box 17a of the input operation screen 17A of the above described display part 17.

Subsequently, in step S2, the CPU 12 determines whether or not one model name of the label printer 3 was selected from the equipment display box 17a via a suitable operation of the operation part 14 by the operator. If one model name was not selected, the decision is made that the condition of step S2 is not satisfied (S2: No), and the flow returns to step S1 where the same procedure is repeated. In a case where the model was selected, the decision is made that the condition of step S2 is satisfied (S2: Yes), and the flow proceeds to step S3. Note that, in a case where model selection is not required or the model is automatically determined by separate means, the above described step S1 and this step S2 may be omitted.

Subsequently, in step S3, the CPU 12 displays a plurality of different languages (for example, English, German, French, Japanese, Spanish, etc.) in the above described language display box 17g of the input operation screen 17A.

Then, in step S4, the CPU 12 determines whether or not at least one of the plurality of different languages displayed in step S3 was selected. If none of the languages was selected, the decision is made that the condition of step S4 is not satisfied (S4: No), and the flow returns to step S3 where the same procedure is repeated. In a case where at least one language was selected, the decision is made that the condition of step S4 is satisfied (S4: Yes), and the flow proceeds to step S5.

Subsequently, in step S5, the CPU 12 transmits the model name of the label printer 3 selected in step S2 and the language selected in step S4 to the contents server SV. As a result, the CPU 120 of the contents server SV searches for the templates T of the plurality of templates T stored in advance in the high capacity memory 160 that correspond to the above described received model name and contain the language version of the above described received language type. Then, the CPU 120 of the contents server SV generates and transmits a template list (a list of template files that correspond to the above described received model name and contain the language version of the above described received language type) corresponding to the operation terminal 2.

Then, in step S6, the CPU 12 determines whether or not the above described template list generated by the CPU 120 of the above described contents server SV was received via the communication control part 15. Until the above described template list is received, the decision is made that the condition of step S6 is not satisfied (S6: No), and the CPU 12 loops and enters a standby state until the condition is satisfied. In a case where the template list was received, the decision is made that the condition of step S6 is satisfied (S6: Yes), and the flow proceeds to step S7.

In step S7, the CPU 12 displays all template files received in list format in the above described step S6 in list format in the list box 17d (in alphabetical order by category group name, for example) of the above described input operation screen 17A of the display part 17, in a form that categorizes the files into the above described category groups (refer to the aforementioned FIG. 3).

Subsequently, in step S8, the CPU 12 determines whether or not a check was input into any of the checkboxes (i.e., a category selection was made) for the category groups displayed in list format in the list box 17d in the above described step S7. If a check has not been input, the decision is made that the condition of step S8 is not satisfied (S8: No), and the flow returns to step S8 where the decision regarding the checkbox is repeated. In a case where a check was input into a checkbox, the decision is made that the condition of step S8 is satisfied (S8: Yes), and the flow proceeds to step S9.

In step S9, the CPU 12 determines whether or not there was an instruction for installation of all template files of the category group selected by the operator in step S8 (specifically, whether or not the Transfer button 17b of the input operation screen 17A was pressed; refer to FIG. 3). If there was not an installation instruction, the decision is made that the condition of step S9 is not satisfied (S9: No), and the CPU 12 loops and enters a standby state until the condition is satisfied. In a case where there was an installation instruction, the decision is made that the condition of step S9 is satisfied (S9: Yes), and the flow proceeds to step S10.

In step S10, the CPU 12 downloads all template files of the category group selected as described above from the contents server SV, and stores the files in the memory 13.

In step S11, the CPU 12 executes a so-called merging process (details described later) that generates the above described single combined file that contains the plurality of language versions of mutually different language types for all templates T downloaded in step S10. This process then terminates here.

Merging Process

Figure 6:
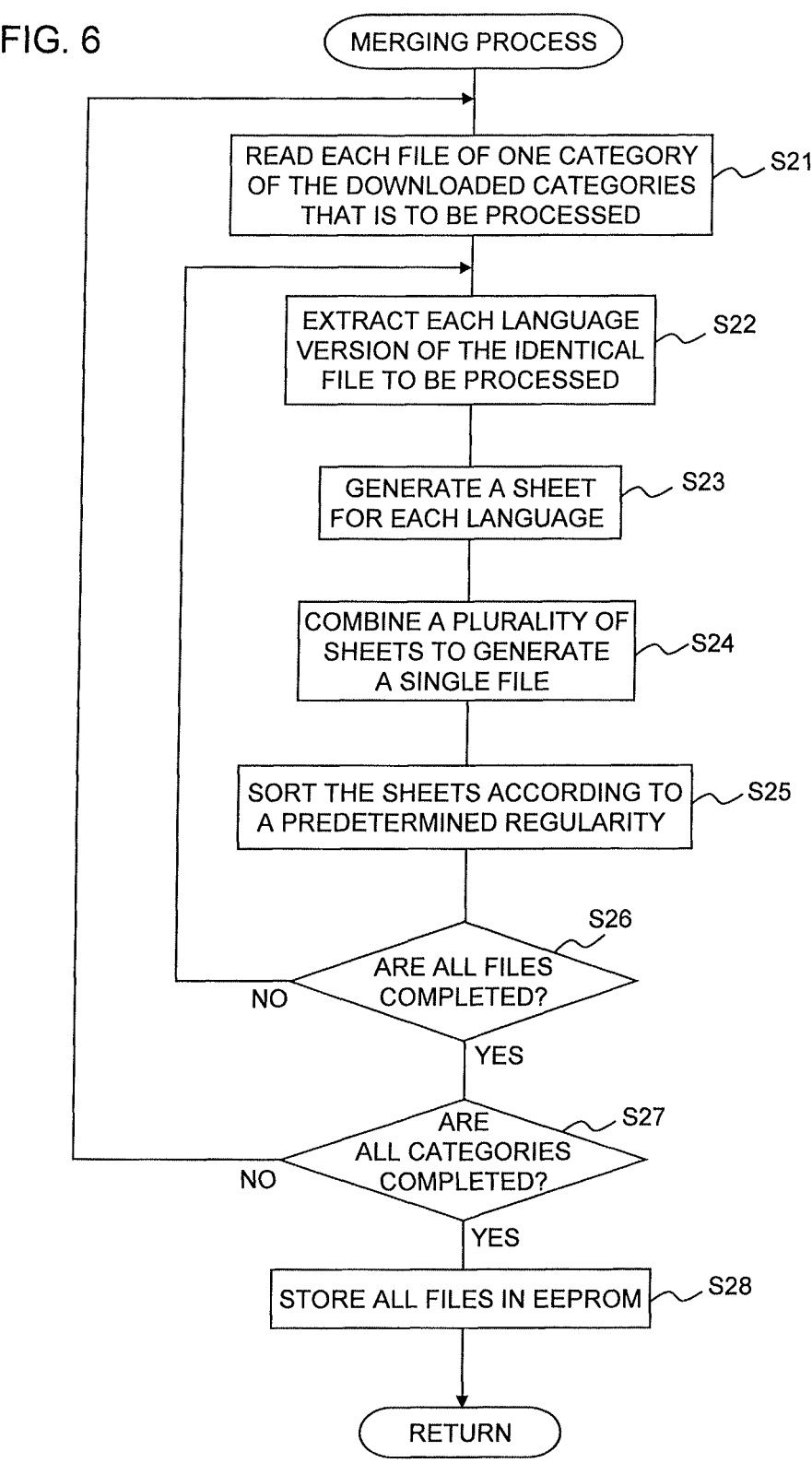
FIG. 6 is a flowchart showing in detail a merging process of step S11 in FIG. 5.

FIG. 6 shows the detailed procedure of the merging process of the above described step S11.

In FIG. 6, first, in step S21, the CPU 12 selects one category group to be processed from all category groups downloaded in the aforementioned step S10, and reads all template files (separate files for each language version at this point in time) included in that category group from the above described memory 13.

Subsequently, in step S22, the CPU 12 selects a plurality of one type of the template files of identical contents to be processed from all template files read in the above described step S21, and extracts each of the plurality of language versions of that one template file type. Following the aforementioned example using FIG. 4A-4C, the German version template file, English version template file, and French version template file expressed in "examinationroom1.lbx" in the category group "Doctor's Office" are extracted and acquired.

Then, in step S23, the CPU 12 provides one sheet per language for the plurality of language versions of the template files of identical contents read in the above described step S22. With this arrangement, following the above described example, the sheet D1 (refer to FIG. 4A) comprising the German version template T1, the sheet D2, (refer to FIG. 4B) comprising the English version template T2, and the sheet D3 (refer to FIG. 4C) comprising the French version template T3 are respectively generated (but not yet combined into the single combined file).

Subsequently, in step S24, the CPU 12 combines each sheet of each language version respectively generated in the above described step S23 into a single template file (the above described combined file). As a result, the above described single combined file, wherein the plurality of language version types of the templates T of identical contents respectively downloaded as separate files is respectively incorporated and combined as sheets, is generated.

Then, in step S25, the CPU 12 sorts the plurality of sheets (containing the respective other language versions of the templates T of identical contents) contained in the single combined file generated in the above described step S24 following the predetermined regularity. In the example of the aforementioned FIGS. 4A-4C, the sheets are alphabetically sorted by language name so that the tab FT1 of the sheet D1 is farthest left, the tab FT2 of the sheet D2 is in the middle, and the tab FT3 of the sheet D3 is farthest right, as already described.

Subsequently, in step S26, the CPU 12 determines whether or not each process of the above described steps S22-S26 was completed for all template files in the one category group to be processed that were read in step S21. If each process has not been completed for all files, the decision is made that the condition of step S26 is not satisfied (S26: No), and the flow returns to step S22 where the same procedure is repeated. If each process was completed for all files, the decision is made that the condition of step S26 is satisfied (S26: Yes), and the flow proceeds to step S27.

In step S27, the CPU 12 determines whether or not each process of the above described steps S21-S26 is completed for all category groups downloaded in the aforementioned step S10. If each process has not been completed for all category groups, the decision is made that the condition of step S27 is not satisfied (S27: No), and the flow returns to step S21 where the same procedure is repeated. If each process was completed for all category groups, the decision is made that the condition of step S27 is satisfied (S27: Yes), and the flow proceeds to step S28.

In step S28, the CPU 12 readably stores all template files that were provided in new single combined files per plurality of language versions of identical contents in each of the procedures of the above described steps S21-S27 in the EEPROM 16.

Figure 7:
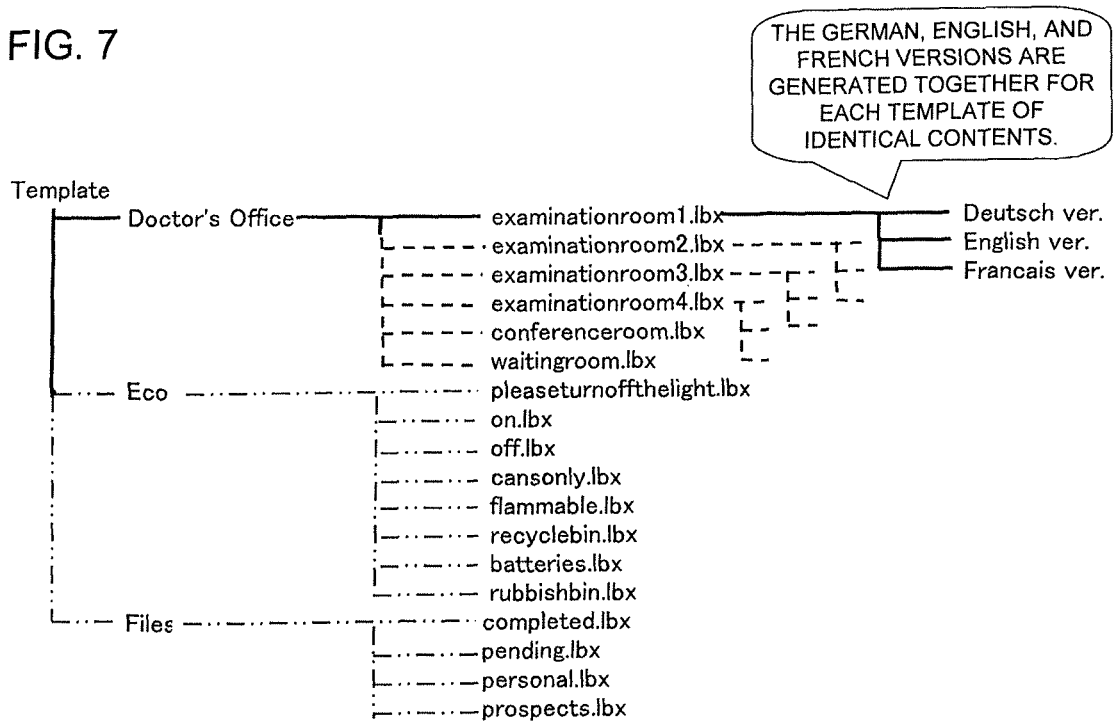
FIG. 7 is a conceptual diagram showing the combined file stored in EEPROM using a tree structure.

FIG. 7 conceptually shows all combined files stored in the EEPROM 16 by the merging process of the above described FIG. 6 in a tree structure. This example in FIG. 7 shows a case where the above described templates T1, T2, and T3 shown in the above described FIGS. 4A-4C are incorporated into a single combined file.

In FIG. 7, as previously described, the category group "Doctor's Office" includes the above described single combined file "examinationroom1.lbx" shown in the above described FIGS. 4A-4C, which contains the German version template T1 of the above described first sheet D1, the English version template T2 of the above described second sheet D2, and the French version template T3 of the above described third sheet D3.

Note that, as indicated by the dashed lines, in addition to the above described combined file "examinationroom1.lbx", the category group "Doctor's Office" includes the combined files "examinationroom2.lbx", "examinationroom3.lbx", "examinationroom4.lbx", "conferenceroom.lbx", waitingroom.lbx", etc., and each of these combined files respectively contains a "German version template", "English version template", and "French version template" in the form of a sheet of each language version, in the same manner as described above.

Further, as indicated by the chain double-dashed lines, in a case where other category groups ("Eco" and "Files" in this example) are also selected in combination with the above described category group "Doctor's Office" of the above described FIG. 3 in the list box 17d of the input operation screen 17A, for example, a tree structure is formed in a manner that includes these as well and stored in the EEPROM 16.

The category group "Eco" includes the combined files "pleaseturnoffthelight.lbx", "on.lbx", "off.lbx", "cansonly.lbx", "flammable.lbx", "recyclebin.lbx", "batteries.lbx", "rubbishbin.lbx", etc., and each of these combined files as well respectively contains a "German version template", "English version template", and "French version template" in the form of a sheet of each language version, in the same manner as described above.

The category group "files" includes the combined files "completed.lbx", "pending.lbx", "personal.lbx", "prospects.lbx", etc., and each of these combined files as well respectively contains a "German version template", "English version template", and "French version template" in the form of a sheet of each language version, in the same manner as described above.

As described above, according to this embodiment, when the selections of the model name and language type by the operator are received (step S2 and step S4), all templates T that correspond to the above described model name and contain the selected language versions are downloaded from the high capacity memory 160 of the contents server SV. Subsequently, each set of downloaded templates T of identical contents is combined and a single combined file is generated (merging process). Each of the combined files contains the respective templates T of the plurality of mutually different language versions.

As a result of the above, in this embodiment, even in a case where the operator wants to acquire two or more language versions of a single template T, it is possible to download the versions together from the contents server SV. Further, even after the downloading, the plurality of language version types is contained together in a single template file (combined file), thereby increasing user-friendliness when reading or otherwise handling the templates T, compared to prior art in which the files are separately provided.

Further, in particular, according to this embodiment, the plurality of language versions of the templates T of common contents to be combined is combined into a single combined file while sorted following a predetermined regularity (refer to step S24 and step S25). As a result, it is possible to arrange, display, and store each language version in an easy-to-understand order in a single combined file where the plurality of language version types of the templates T of identical contents is put together (refer to FIGS. 4A-4C and FIG. 7).

Further, in particular, according to this embodiment, the category group is selected by the operator (refer to the list box 17d of FIG. 3), and all template files included in that selected category group are downloaded (refer to step S9 and step S10 of FIG. 5). With this arrangement, compared to a case where the operator downloads files without specifying a category, the amount of data transmitted from the contents server SV to the operation terminal 2 can be decreased. Further, by excluding the category groups that the operator does not want to process, it is possible to avoid pointless downloading processes. As a result of the above, it is also possible to shorten the time required for processing and decrease the memory capacity required for processing in the operation terminal 2.

Note that the present disclosure is not limited to the above described embodiment, and various modifications may be made without deviating from the spirit and scope of the disclosure. A detailed description follows.

(1) When Downloading and Combining Additional Other Language Versions

As previously described, according to the above described embodiment, when the operator specifies and downloads several language types from the contents server SV via the operation part 14, a single combined file is stored in the EEPROM 16 by the aforementioned merging process. This modification is an example corresponding to a case where, in a state where a combined file has already been generated and stored in this manner, the operator subsequently wants to further specify and download additional other language types for the template T of identical contents. In such a case, according to this modification, the template file of a new language version acquired by subsequent downloading is merged with the template files (containing the plurality of language version types in the form of individual sheets) already stored in the EEPROM 16, and a new single combined file is provided. A detailed description follows.

Figure 8:
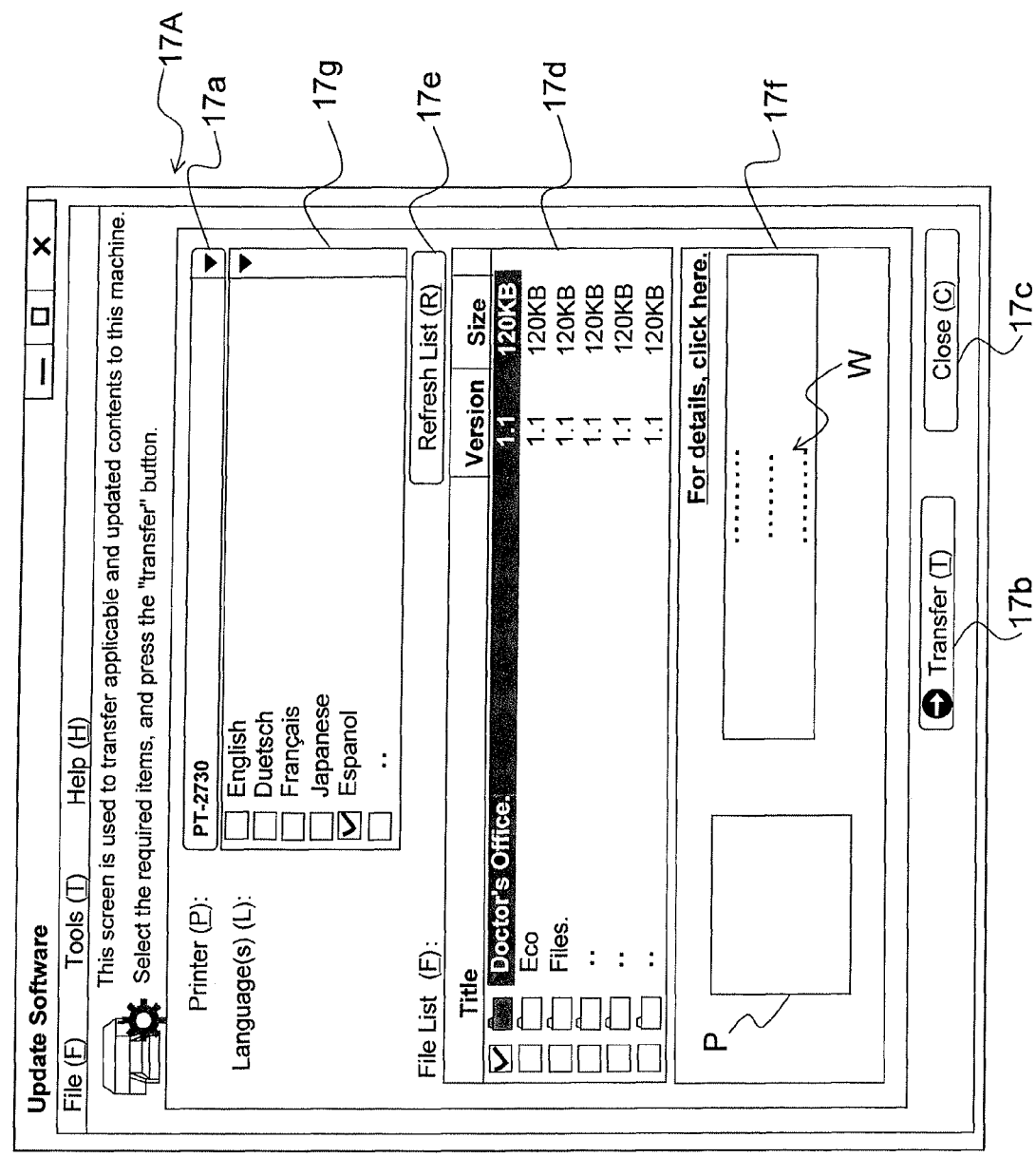
FIG. 8 is a diagram showing a display example of the display part of the operation terminal at the time of template installation, in a modification where other language versions are additionally downloaded and a combined file is generated.

FIG. 8 shows an example of the input operation screen 17A displayed on the display part 17 of the above described operation terminal 2 of this modification. FIG. 8 corresponds to FIG. 3 of the above described embodiment. This example describes a case where a single template file "examinationroom1", which contains each of the German, English, and French version templates T1, T2, and T3, has been already generated and stored in the category group "Doctor's Office", following the example of the above described embodiment.

In the above described state, it is presumed that the operator wants to download the Spanish version of the above described template file "examinationroom1". The operator first selects "PT-2730" using the above described equipment display box 17a in the same manner as previously described, and then inputs a check in the Spanish checkbox among the languages displayed in the above described language display box 17g. Subsequently, in the list box 17d displayed based on the aforementioned search results of the contents server SV, the operator inputs a check in the checkbox of the category group "Doctor's Office" in the same manner as described above. Then, the operator presses the above described Transfer button 17b, thereby downloading the above described selected Spanish version of all templates T of the selected category group "Doctor's Office" from the contents server SV. At this point in time, the Spanish version is an individual, single template file, and is downloaded in the form of that independent template file. Note that, according to this modification, settings are set so that, in a case where the operator mistakenly selected a German, English, or French version that has already been downloaded and incorporated into the combined file (in a case where the operator mistakenly input a check in the German, English, or French checkbox), the template file of the mistakenly selected duplicate language version is not incorporated into the combined file after downloading (avoiding duplicate combinations; refer to step S220 of FIG. 11 described later). Then, according to this modification, the independent template file which contains the Spanish version template, is merged into the above described template file "examinationroom1", which contains each of the sheets D1, D2, and D3 of the aforementioned German, English, and French version templates T1, T2, and T3, as previously described.

Figure 9A:
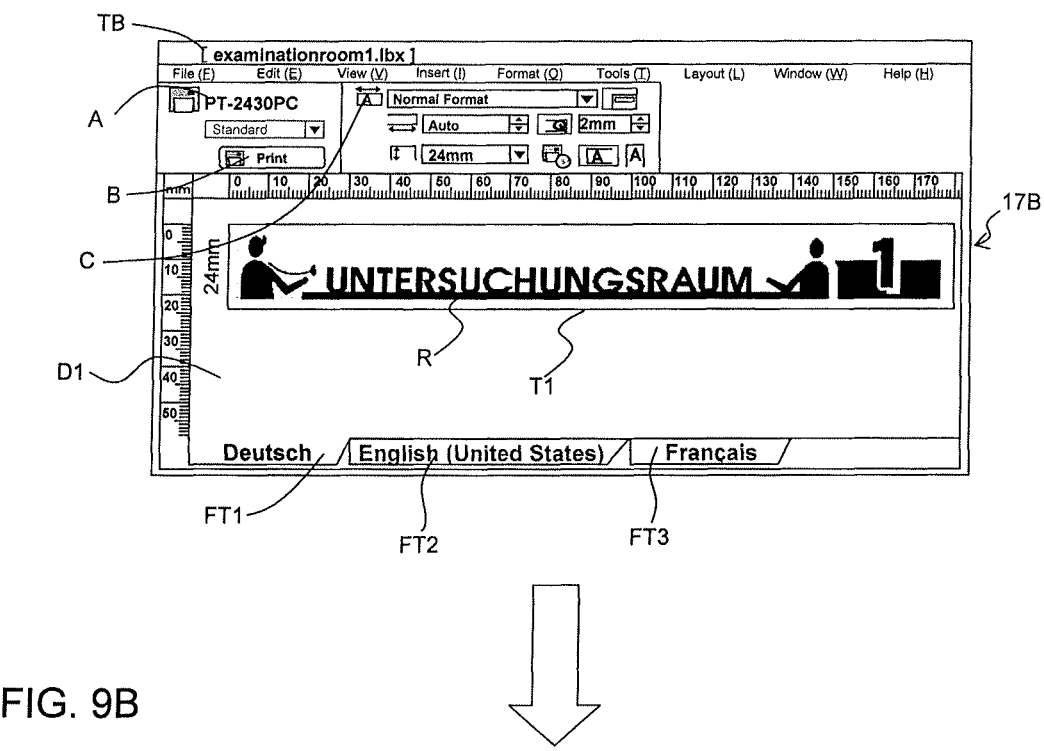
FIG. 9A is an explanatory diagram showing a display example of the display part of the operation terminal, based on a combined file into which a Spanish version was newly added to a combined file that contains a German version, English version, and French version.

The state of the above described merging will now be described using FIG. 9. FIG. 9A is an example of the template display screen 17B displayed on the above described display part 17 of the operation terminal 2, based on the combined file already generated as previously described, and is equivalent to the above described FIG. 4A. In the state prior to the merging shown in FIG. 9A, the first sheet D1 which contains the German version template T1 comprising the print R of the contents of the "Examination Room" expressed in German, the second sheet D2 which contains the English version template T2 in which the identical content is expressed in English, and the third sheet D3 which contains the French version template T3 in which the identical content is expressed in French are provided in a single template file, as previously described.

Figure 9B:
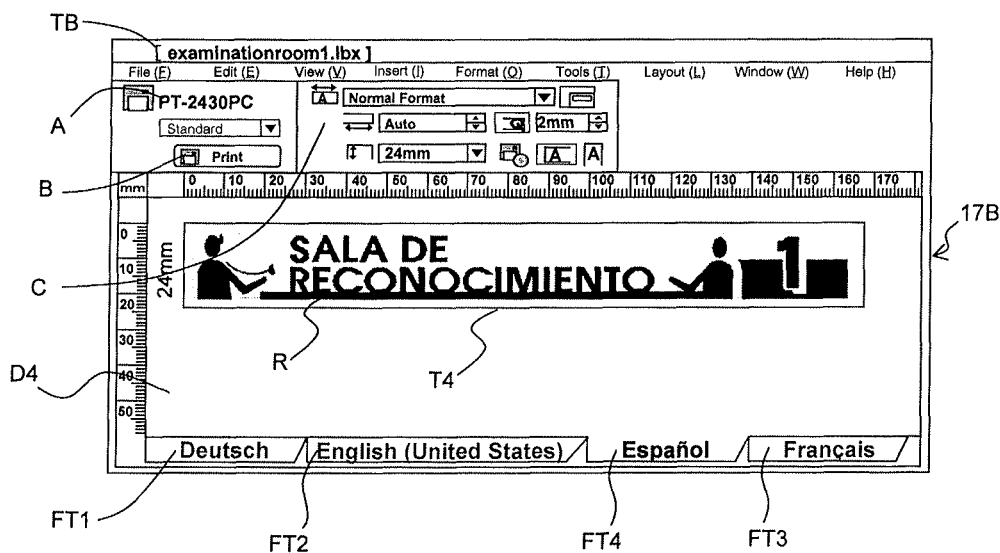
FIG. 9B is an explanatory diagram showing a display example of the display part of the operation terminal, based on a combined file into which a Spanish version was newly added to a combined file that contains a German version, English version, and French version.

In such a state, when the above described merging is performed via the aforementioned operation of the operator, a fourth sheet D4 which contains a Spanish version template T4 comprising the print R of the "Examination Room" contents expressed in Spanish is added, as shown in FIG. 9B. That is, the first sheet D1 which contains the above described template T1, the second sheet D2 which contains the above described template T2, the third sheet D3 which contains the above described template T3, and the fourth sheet D4 which contains the above described template T4 are combined into a single template file. At this time, as previously described, each of the sheets D1, D2, D3, and D4 respectively comprises the tabs FT1, FT2, FT3, and FT4 on the lower end, and the displays are interswitchable. FIG. 9B shows the state where the fourth sheet D4, which contains the above described print R expressed in Spanish, is displayed when the tab FT4 is selected.

At this time, the layered order of each of the above described sheets D1-D4 (in other words, the left to right order of the tabs FT1-FT4) is sorted alphabetically by language in this example, in the same manner as previously described. That is, the tab FT1 of the sheet D1 expressed in German, which has the first character "D", is positioned farthest to the left, the tab FT2 of the sheet D2 expressed in English, which has the first character "E" followed by the character "n", is positioned next, the tab FT4 of the sheet D4 expressed in Spanish, which has the first character "E" followed by the character "s", is positioned next, and the tab FT3 of the sheet D3 expressed in French, which has the first character "F", is positioned farthest to the right. As a result, as understood upon comparison of FIG. 9A and FIG. 9B, the sheets are combined and displayed so that the fourth sheet D4, which contains the Spanish version template T4, is inserted between the second sheet D2, which contains the English version template T2, and third sheet D3, which contains the French version template T3.

Figure 10:
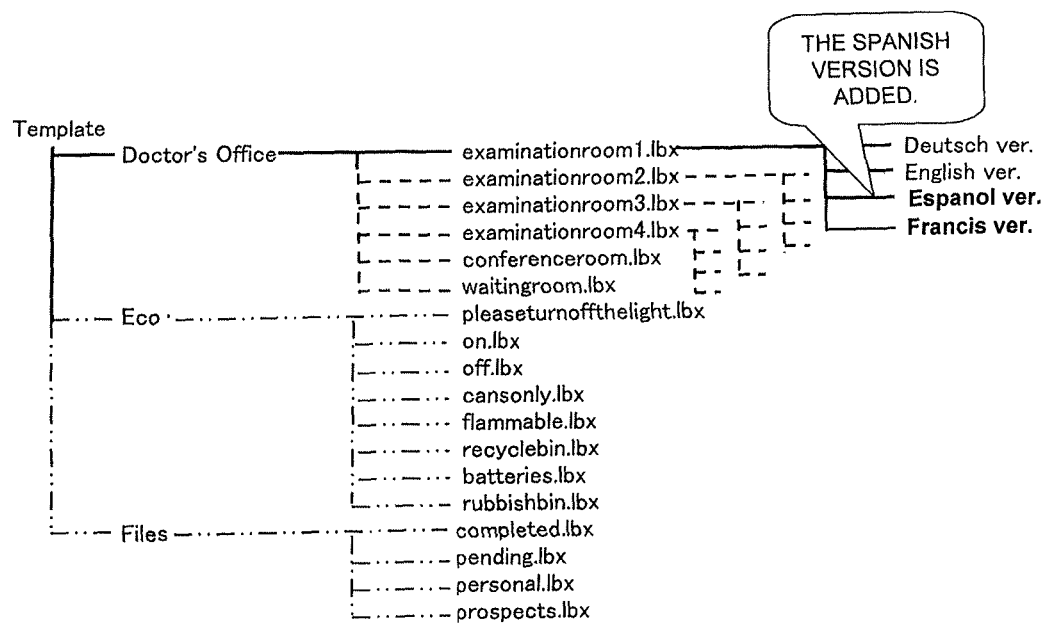
FIG. 10 is a conceptual diagram showing the combined file stored in EEPROM using a tree structure.

FIG. 10 conceptually shows all combined files stored in the EEPROM 16 by the above described merging process of this modification, in a tree structure in the same manner as FIG. 7. As shown in FIG. 10, according to this modification, the category group "Doctor's Office" includes the above described single combined file "examinationroom1.lbx", which contains the German version template T1 of the above described first sheet D1, the English version template T2 of the above described second sheet D2, the French version template T3 of the above described third sheet D3, and the Spanish version template T4 of the above described fourth sheet D4. The same holds true for the other template files and category groups as well.

FIG. 11 shows the detailed procedure of the above described merging process within the control procedure executed by the CPU 12 of the operation terminal 2 of this modification. FIG. 11 corresponds to the above described FIG. 6.

In the flow shown in FIG. 11, steps S220, S221, and S222 are newly provided between step S22 and step S23 in the flow of the above described FIG. 6.

In FIG. 11, after the same steps S21 and S22 as in the above described FIG. 6, the flow proceeds to the newly provided step S220. In step S220, the CPU 12 determines whether or not a template file (combined file) of the identical name is already stored in the EEPROM 16. If a file of the identical name has not been stored, the decision is made that the condition of step S220 is not satisfied (S220: No) and the flow proceeds to step S23 in the same manner as in the above described FIG. 6 where the same merging process as that in the above described FIG. 6 is executed. On the other hand, if a template file (combined file) of the identical name is stored, the decision is made that the condition of step S220 is satisfied (S220: Yes), and the flow proceeds to the newly provided step S221.

In step S221, the CPU 12 generates a sheet by language for each language of the template T of each language version among the plurality of language versions of a single template file type extracted in the above described step S22 that has not been stored in the above described EEPROM 16. With this arrangement, in the example shown in the above described FIG. 8 and FIG. 9, a sheet is generated for only the Spanish version template file, even in a case where, in addition to the Spanish checkbox, the operator mistakenly input a check in the German, English, or French checkbox which has already been downloaded and incorporated into the combined file, resulting in the downloading of the Spanish, German, English, and French version template files, as touched upon in the description of the above described FIG. 8.

Subsequently, in step S222, the CPU 12 merges (combines) the template T for which a sheet was generated in step S221 with the already stored sheets, providing a new combined file. In the aforementioned example, the fourth sheet D4 which contains the Spanish version template T4 is added to the combined file (refer to FIG. 9A) made of the first sheet D1 which contains the German version template T1, the second sheet D2 which contains the English version template T2, and the third sheet D3 which contains the French version template T3. As a result, the first sheet D1 which contains the above described template T1, the second sheet D2 which contains the above described template T2, the third sheet D3 which contains the above described template T3, and the fourth sheet D4 which contains the above described template T4 are combined into a single template file (refer to FIG. 9B). Subsequently, the flow proceeds to FIG. 25 in the same manner as in FIG. 6 and, as previously described, these first to fourth sheets D1-D4 are sorted in a predetermined order.

All other procedures are the same as those in FIG. 6, and descriptions thereof will be omitted.

As described above, in this modification, of the plurality of templates T stored in the contents server SV, the template files that correspond to the model name "PT-2730", are affiliated with the one received template category "Doctor's Office", and contain a Spanish version are downloaded from the contents server SV and combined. As a result, it is possible to generate a single new combined file that contains the German, English, French, and Spanish version templates T1, T2, T3, and T4. With this arrangement, even in a case where the plurality of template language versions is downloaded over a period of multiple times, the plurality of language version types of the templates of identical contents is reliably put together in a single file and maintained in that state. As a result, operator user-friendliness is further improved.

(2) Other

While the above has described an illustrative scenario in which the templates T were divided and grouped into the above described category groups, the present disclosure is not limited thereto. In a case where grouping is not performed, the template names rather than the category group names may be displayed in list format in the list box 17d shown in the above described FIG. 3 and FIG. 8, and the same process as described above may be performed by the direct selection of templates by the operator.

Further, while the above has described an illustrative scenario in which the label printer 3 performs printing on the tape 203 of the print-receiving medium fed out from the tape roll 204 and cuts the tape 203 to produce the print label L, the present disclosure is not limited thereto, allowing a method wherein the print label L is produced using a tape that bonds together a base tape and a cover film (print-receiving medium) other than a base tape on which printing is performed.

Further, while the template used during label production is described as an example of contents in the above described example, the present disclosure is not limited thereto. That is, other images used in relation to label production as well as OS, application, and various driver and other software, etc., may be used as the processing target of the present disclosure. In each of these cases as well, the same advantages are achieved.

Also note that the present disclosure is not limited to the procedures shown in the flowcharts of FIG. 5, FIG. 6, and FIG. 11, and procedure additions and deletions as well as sequence changes may be made without deviating from the spirit and scope of the disclosure.

What is claimed is:

1. A non-transitory computer-readable recording medium, storing the template processing program for executing steps on a control device of an operation terminal, which is connected with a print label producing apparatus configured to produce a print label using a template to which a print object including a print is assigned and configured in a predetermined arrangement, and with a server configured to store a first template of a first language version and a second template of a second language version wherein said first template has a first file name described in a first language and a first text that indicates said print in a second language as well as said second template has said first file name described in said first language and a second text that indicates said print in a third language, so that information is transmitted and received, and comprises an operation device, a display device configured to execute a preferred display, said control device, and a memory, said steps comprising:

a display control step performed by said control device for controlling said display device to display a first display that said first language version and said second language version are capable of being selected in a lump and to display a second display for a download instruction operation of said first language version and said second language version;

automatic performing processes being automatically performed by said control device in the case that said first language version and said second language version are selected in a lump as well as the download instruction operation of said first language version and said second language version is executed with regard to said first and said second displays of said display device at said display control step the automatic performing processes including:
a first downloading process for downloading said first language version and said second language version in a lump from said server;
a first comparing process for comparing said first file name of said first template with said first file name of said second template, said first template being included in said first language version downloaded in said first download process, said second template being included in said second language version downloaded in said first download process; and
a generating process for generating one combined file, being performed in the case that said first file name of said first template matches said first file name of said second template in said first comparing process wherein said first template downloaded in said first downloading process is formed into a first sheet as a piece of sheet, said second template downloaded in said first downloading process is formed into a second sheet as a piece of sheet, and then said combined file is generated as a single file provided with said first file name, wherein said first sheet has a first tab where a name of said second language is described in said second language that indicates said first text of said first template as well as said second sheet has a second tab where a name of said third language is described in said third language that indicates said second text of said second template; and
a storing step performed by said control device for storing said generated combined file in said memory.

2. The recording medium according to claim 1, wherein:
said server is configured to store a third template of a third language version wherein said third template has said first file name described in said first language and a third text that indicates said print in a fourth language,
in said display control step, said display device is controlled to display a third display that said third language version is capable of being further selected and to display a fourth display for a download instruction operation of said third language version,
in said automatic performing processes, in the case that said third language version are selected as well as the download instruction operation of said third language version is executed with regard to said third and said fourth displays of said display device at said display control step the processes executed includes:
a second downloading process for downloading said third language version;
a second comparing process for comparing said first file name of said third template with said first file name of said combined file, said third template being included in said third language version downloaded in said second download process, said combined file being stored in said memory; and
a merging process for merging said third template to said combined file, being performed in the case that said first file name of said third template matches said first file name of said combined file in said second comparing process; wherein said third template downloaded is formed into a third sheet as a piece of sheet, and then is merged with said combined file so as to form a single file, wherein said third sheet has a third tab where a name of said fourth language is described in said fourth language that indicates said third text of said third template,
in said storing step said combined file that said third template is merged with is stored in said memory.

3. A template processing method for executing steps by a control device of an operation terminal, which is connected with a print label producing apparatus configured to produce a print label using a template to which a print object including a print is assigned and configured in a predetermined arrangement, and with a server configured to store a first template of a first language version and a second template of a second language version wherein said first template has a first file name described in a first language and a first text that indicates said print in a second language as well as said second template has said first file name described in said first language and a second text that indicates said print in a third language, so that information is transmitted and received, and comprises an operation device, a display device configured to execute a preferred display, said control device, and a memory, said steps comprising:
a display control step performed by said control device for controlling said display device to display a first display that said first language version and said second language version are capable of being selected in a lump and to display a second display for a download instruction operation of said first language version and said second language version;
automatic performing processes being automatically performed by said control device in the case that said first language version and said second language version are selected in a lump as well as the download instruction operation of said first language version and said second language version is executed with regard to said first and said second displays of said display device at said display control step the automatic performing processes including:
a first downloading process for downloading said first language version and said second language version in a lump from said server;
a first comparing process for comparing said first file name of said first template with said first file name of said second template, said first template being included in said first language version downloaded in said first download process, said second template being included in said second language version downloaded in said first download process; and
a generating process for generating one combined file, being performed in the case that said first file name of said first template matches said first file name of said second template in said first comparing process wherein said first template downloaded in said first downloading process is formed into a first sheet as a piece of sheet, said second template downloaded in said first downloading process is formed into a second sheet as a piece of sheet, and then said combined file is generated as a single file provided with said first file name wherein said first sheet has a first tab where a name of said second language is described in said second language that indicates said first text of said first template as well as said second sheet has a second tab where a name of said third language is described in said third language that indicates said second text of said second template; and
a storing step performed by said control device for storing said generated combined file in said memory.

4. The recording medium according to claim 1, wherein:
in said combined file generated in said generating process, said first sheet has said first tab in a lower end portion of the first sheet, as well as said second sheet has said second tab in a lower end portion of the second sheet.

5. The recording medium according to claim 4, wherein:
said display device, in a case one of said first tab and said second tab is selected, displays in the foreground a sheet that includes the selected tab.

6. The recording medium according to claim 4, wherein:
said control device is further caused to execute a display step for displaying the one combined file generated in said generating process on said display device,
in said display step, the one combined file generated in said generating process is displayed on said display device so that said first tab and said second tab are arranged side by side in the left-and-right direction.

7. The recording medium according to claim 6, wherein:
in said display step, the one combined file is displayed so that said first tab and said second tab are arranged side by side in the left-and-right direction according to predetermined regularity.

8. The recording medium according to claim 7, wherein:
said predetermined regularity is the alphabetical order of the names of said languages described in said first tab and said second tab.

9. The recording medium according to claim 7, wherein:
said predetermined regularity is an order of length of each of said first template and said second template.

10. The recording medium according to claim 7, wherein:
said predetermined regularity is a sequential order of the time that each of said first template and said second template has been made.

\* \* \* \* \*